(12) United States Patent
Augusto Arroyo et al.

(10) Patent No.: US 12,480,064 B2
(45) Date of Patent: Nov. 25, 2025

(54) PROCESS FOR THE REMOVAL OF $H_2S$ FROM NATURAL GAS AT HIGH PRESSURES BY MEANS OF A PSA PROCESS

(71) Applicants: Petróleo Brasileiro S.A.—Petrobras, Rio de Janeiro (BR); Universidade Estatual de Maringá, Maringá (BR)

(72) Inventors: Pedro Augusto Arroyo, Maringá (BR); Fernando Gusman Brandao, Rio de Janeiro (BR); Jailton Ferreira Do Nascimento, Rio de Janeiro (BR); Leonardo Hadlich De Oliveira, Maringá (BR); Artur Lemes Moretti, Maringá (BR)

(73) Assignees: Petróleo Brasileiro S.A.—Petrobras, Rio de Janeiro (BR); Universidade Estatual de Maringá, Maringá (BR)

( * ) Notice: Subject to any disclaimer, the term of this patent is extended or adjusted under 35 U.S.C. 154(b) by 438 days.

(21) Appl. No.: 17/990,146

(22) Filed: Nov. 18, 2022

(65) Prior Publication Data

US 2023/0158443 A1 May 25, 2023

(30) Foreign Application Priority Data

Nov. 19, 2021 (BR) ...................... 10 2021 023294 3

(51) Int. Cl.
*C10L 3/10* (2006.01)
*B01D 53/047* (2006.01)

(52) U.S. Cl.
CPC ............ *C10L 3/103* (2013.01); *B01D 53/047* (2013.01); *B01D 2253/1085* (2013.01);
(Continued)

(58) Field of Classification Search
None
See application file for complete search history.

(56) References Cited

U.S. PATENT DOCUMENTS

2021/0387131 A1* 12/2021 Matthyssen .......... B01D 53/047

FOREIGN PATENT DOCUMENTS

| AU | 2012223485 A1 | 9/2013 |
|---|---|---|
| AU | 2012223560 B2 | 4/2016 |

(Continued)

OTHER PUBLICATIONS

JP2020163344A_ENG (Espacenet machine translation of Maniwa) (Year: 2020).*

(Continued)

*Primary Examiner* — Gabriel E Gitman
(74) *Attorney, Agent, or Firm* — Morrison & Foerster LLP (57) ABSTRACT

The present invention addresses to the use of NaY zeolite with a Si/Al ratio>2.6 as a solid adsorbent in the process of removing $H_2S$ from natural gas through a PSA process. The described adsorbent has the capacity of removing $H_2S$ from natural gas from offshore exploration platforms, enabling in situ regeneration. The experimental development proved the high capacity of capturing $H_2S$ by the NaY zeolite in consecutive cycles of pressurization, adsorption, depressurization and purging. This capture capacity remains at 74.2% of the initial capacity, remaining stable in subsequent cycles. The structure of the material maintained crystallinity above 95% in use, in 15 consecutive cycles, allowing the reuse of the adsorbent for a prolonged period of operation, preventing the solid from being constantly changed, which is quite common in a non-regenerative process.

8 Claims, 7 Drawing Sheets

(52) U.S. Cl.
CPC .... *B01D 2253/304* (2013.01); *B01D 2256/24* (2013.01); *B01D 2257/304* (2013.01); *B01D 2259/40013* (2013.01); *B01D 2259/40043* (2013.01); *B01D 2259/40064* (2013.01); *B01D 2259/401* (2013.01)

(56) References Cited

FOREIGN PATENT DOCUMENTS

| | | | |
|---|---|---|---|
| AU | 2012259377 | B2 | 12/2016 |
| BR | 102017001342 | A2 | 4/2017 |
| BR | 112015000151 | A2 | 6/2017 |
| BR | 112019002106 | A2 | 5/2019 |
| EP | 1480733 | A1 | 12/2004 |
| EP | 1234947 | B1 | 8/2005 |
| JP | 2020163344 | A  * | 10/2020 |
| WO | 2008143825 | A1 | 11/2008 |
| WO | 2012138910 | A2 | 10/2012 |

OTHER PUBLICATIONS

De Oliveira ((2019). H2S adsorption on NaY zeolite. Microporous and Mesoporous Materials, 284, 247-257.) (Year: 2019).*

Araujo et al. (2017) "Comparative Analysis of Separation Technologies for Processing Carbon Dioxide Rich Natural Gas in Ultra-deepwater Oil Fields", Journal of Cleaner Production, 155:12-22.

Bulow et al. (1999) "The Mutual Transformation of Hydrogen Sulphide and Carbonyl Sulphide and Its Role for Gas Desulphurization Processes with Zeolitic Molecular Sieve Sorbents", Surface Science and Catalysis, 120:301-345.

Felice et al. (2015) "Prediction of the Early Breakthrough of a Diluted H2S and Dry Gas Mixture When Treated by Sulfatreat Commercial Sorbent", Biomass and Bioenergy, 74:244-252.

Georgiadis et al. (May 8, 2020) "Removal of Hydrogen Sulfide From Various Industrial Gases: A Review of the Most Promising Adsorbing Materials", Catalysts, 10:36 pages.

Grande, Carlos A. (Dec. 9, 2012) "Advances in Pressure Swing Adsorption for Gas Separation", ISRN Chemical Engineering, 13 pages.

Karge et al. (May 1978) "Hydrogen Sulfide Adsorption on Faujasite-Type Zeolites with Systematically Varied Si-Al Ratios", Journal of Colloid and Interface Science, 64(3):522-532.

Li et al. (2011) "Dual Mode Roll-up Effect in Multicomponent Non-isothermal Adsorption Processes with Multilayered Bed Packing", Chemical Engineering Science, 66(9):1825-1834.

Lutz et al. (1998) "On the Formation of COS from H2S and CO2 in the Presence of Zeolite! Salt Compounds", Adsorption Science and Technology, 16(7):577-581.

Oliveira et al. (2019) "H2S Adsorption on Nay Zeolite", Microporous and Mesoporous Materials, 284:247-257.

Sigot et al. (2016) "Adsorption of Hydrogen Sulfide (H2S) on Zeolite (Z): Retention Mechanism", Chemical Engineering Journal, 287:47-53.

Tomadakis et al. (Mar. 3, 2011) "Pressure-Swing Adsorption Separation of H2S from CO2 with Molecular Sieves 4A, 5A, and 13X", Separation Science and Technology, 46(3):428-433.

National Petroleum. Agency. ANP Resolution No. 16, of Jun. 17, 2008.

* cited by examiner

PROCESS FOR THE REMOVAL OF H₂S FROM NATURAL GAS AT HIGH PRESSURES BY MEANS OF A PSA PROCESS

CROSS-REFERENCE TO RELATED APPLICATION

This application claims priority to Brazilian Application No. 10 2021 023294 3, filed on Nov. 19, 2021, and entitled "PROCESS FOR THE REMOVAL OF H2S FROM NATURAL GAS AT HIGH PRESSURES BY MEANS OF A PSA PROCESS," the disclosure of which is incorporated herein by reference in its entirety.

FIELD OF THE INVENTION

The present invention addresses to an application of NaY zeolite of high Si/Al ratio in the removal of hydrogen sulfide ($H_2S$) present in dry or wet natural gas by Pressure Swing Adsorption (PSA) process—Pressure Modulated Adsorption. Specifically, the NaY zeolite with Si/Al ratio>2.6 is presented as a partially regenerable adsorbent in the removal of $H_2S$ when subjected to a PSA process intended to remove acidic gases from natural gas from pre-salt wells, producing a stream of purified natural gas at high pressure.

DESCRIPTION OF THE STATE OF THE ART

The interest in natural gas and its products has grown in recent years because it is a clean and safe fossil fuel compared to others. In the Brazilian market, however, the price of natural gas for industries is almost 5 times higher than that practiced in the American market. Much of the responsibility for the high price of natural gas is due to the fact that it has a high cost of exploration.

In Brazil, offshore oil production is predominant in the pre-salt polygon. Natural gas exploration costs in this modality are very high, as the producing wells are far from the shore, at a high exploration depth and may contain considerable amounts of acidic gases such as carbon dioxide ($CO_2$) and hydrogen sulfide ($H_2S$), among others, causing this gas, without proper treatment, not to comply with the specifications for use, transport and storage.

The volume of natural gas to be processed is very large and if it still has a high amount of contaminants, then the processing cost will be even higher (ARAÚJO, O. Q. F. et al. "Comparative analysis of separation technologies for processing carbon dioxide rich natural gas in ultra-deepwater oil fields." Journal of Cleaner Production, v. 155, p. 12-22, 2017). The amount of $H_2S$ allowed in commercialized natural gas is only 10 mg m$^{-3}$ (National Petroleum Agency. "ANP Resolution No. 16, of Jun. 17, 2008"). In this way, the removal of $H_2S$ is extremely necessary.

Thus, there is a need for purification of raw gas to meet established standards and specifications; however, the classic processes currently employed contribute significantly to the increase in the final price of the product. In this way, research into more efficient natural gas purification technologies becomes an increasingly growing need in order to meet the needs of contemporary society.

For the removal of acidic gases $CO_2$ and $H_2S$, there can be used absorption processes with solvents, cryogenic distillation, membrane separation and adsorption or combinations of these methods (KIDNAY, A. J.; PARRISH, W. R. "Fundamentals of Natural Gas Processing", CRC Press, 2006). Although the removal of acidic gases from natural gas by PSA is not a readily available technology, it is an emerging technology that is quite competitive in relation to membrane technology, as it allows ease of automation, in addition to enabling the regeneration of the adsorbent and high efficiency in the treatment of streams with low concentration of contaminants, where the membranes fail.

The use of technologies based on absorption with amines has as its main disadvantage the high operating costs related to the regeneration of the liquid stream, which is not necessary in a PSA process.

The use of iron oxides has as its main disadvantage the fact that $H_2S$ is removed from the gas stream irreversibly producing a solid waste containing iron sulfide, in addition to causing significant environmental impact because this solid is pyrophoric. In addition, the recurrent replacement of the solid represents a high cost, which can be avoided by using a regenerable solid, in the Pressure Swing Adsorption (PSA) process, since the regeneration of the adsorbent solid occurs in situ. In this sense, the adsorbent material must be stable in face of the separation process in continuous operation.

The adsorption units should preferably allow the regeneration of the solid used in the removal of contaminants. This regeneration can be performed by changing the total operating pressure by means of the PSA process.

Faujasite-type zeolites strongly interact with $H_2S$, and may promote $H_2S$ chemisorption, making the regeneration process more costly. However, NaY zeolites with Si/Al ratio greater than 2.6 show reversible adsorption. Even if a portion of $H_2S$ is still retained in this adsorbent, there is still a high capacity for capturing $H_2S$, with the possibility of removing the portion of adsorbed $H_2S$ by reducing the absolute pressure.

In addition to allowing the adaptation of gas to market specifications, the removal of contaminants from natural gas is important in the maintenance of pipelines and process equipment, since acidic gases such as $CO_2$ and $H_2S$ contribute to corrosion in the presence of moisture, reducing the useful life of these equipment and making the production process more expensive.

Regarding the different natural gas purification processes previously mentioned, it should further be highlighted that technologies based on absorption with amines, such as Selexol™ and Rectisol™, can be used to remove $H_2S$ from a natural gas stream, although presenting disadvantages such as high installation and operation costs, as well as high energy consumption. Even in integrated absorption technologies, heating of the regenerating material may be necessary. An example is found in patent BR 112015000151-3 A2. In this invention, it is proposed to separate $CO_2$ from a stream containing hydrocarbons, $CO_2$ and $H_2S$ by means of an absorption process involving solvents integrated into a Claus process. Another example is patent document EP1480733A1, which describes a combined adsorption and absorption process for the removal of $H_2S$ and mercaptans from a natural gas stream. The current proposal for patent of invention differs from the aforementioned inventions, as it presents the application of NaY zeolite in an adsorption-based process, more specifically a PSA process. The adsorbent presents partial regeneration when the operating pressure is modulated, allowing an in-situ regeneration.

An example of absorption technology integrated with another is presented in patent BR 102017001342-1 A2. In the document, water is used as a solvent in the removal of $H_2S$ from a gaseous stream. The $H_2S$ retained in the solvent is removed in a reactive adsorption bed in an oxycatalyst. Thus, in addition to an absorption column, it is necessary to use a column containing the oxycatalyst and equipment for drying the desulfurized gas stream. The present invention uses only NaY zeolite arranged in an adsorption bed. In this configuration, a stream of dry natural gas free of $H_2S$ is produced.

The technologies based on the use of iron oxide (FexOy) that stand out the most are IRON SPONGE and SULFATREAT. In the IRON SPONGE technology, hydrated iron oxide is supported on wood chips, while in the SULFATREAT technology mixed iron oxide particles are supported on a ceramic matrix. In these technologies, $H_2S$ is removed from the gas stream irreversibly producing a solid waste containing iron sulfide (DI FELICE, R.; PAGLIAI, P. (2015). "Prediction of the early breakthrough of a diluted $H_2S$ and dry gas mixture when treated by Sulfatreat commercial sorbent." Biomass and Bioenergy, v. 74, p. 244-252). The main disadvantage of these technologies is the high cost of transporting the solid, which must be periodically changed.

Patent EP1234947B1 proposes the removal of $H_2S$ and/or $CO_2$ from a stream of crude oil or natural gas through the use of iron nanoparticles deposited in fractures present in oil wells. The present invention, on the other hand, proposes the use of a NaY zeolite with a Si/Al ratio>2.6 for the removal of $H_2S$ from a natural gas stream. In addition, the NaY zeolite is placed in a stainless-steel column, forming a packed bed. In this configuration, the NaY zeolite can be partially regenerated in situ, allowing its use without periodic replacement.

In addition to reactive adsorption on oxides, the main continuous separation processes based on adsorption involve modulation of pressure (Pressure Swing Adsorption, PSA), temperature (Temperature Swing Adsorption, TSA), vacuum pressure (Vacuum Swing Adsorption, VSA) or combinations thereof. When it comes to PSA, several configurations are possible, allowing the use of two or more adsorption beds, in single or multiple pressurization and depressurization steps.

PSA technology has several applications: hydrogen purification; separation of atmospheric air components; $CO_2$ removal from gaseous stream; and purification of noble gases. This technology is associated with low energy consumption when compared to other technologies (GRANDE, C. A. "Advances in Pressure Swing Adsorption for Gas Separation", ISRN Chemical Engineering, 2012, p. 1-13).

In the PSA technology, a high-pressure gas stream containing the contaminant is allowed to pass through a solid adsorbent, which selectively captures this contaminant, producing a decontaminated stream. The adsorption must be totally or partially reversible, allowing the total or partial removal of the adsorbed component by decreasing the total pressure. In this sense, the choice of adsorbent is essential in the PSA separation process. The adsorbent must have mechanical strength to withstand frequent pressurizations and depressurizations, as well as a high capacity for removing contaminants and the possibility of regeneration, in order to prolong its use in the process.

In patent AU2012223485, a process equipment is presented to remove $CO_2$ and $H_2S$ from natural gas through a pressure swing adsorption (PSA) process of fast cycle. While the document has priority in describing the process equipment in which the acidic gas removal process takes place, the present invention presents NaY zeolite with Si/Al ratio>2.6, a commercially available material that has a high $H_2S$ removal capacity and that maintains this high removal capacity for several cycles of adsorption/desorption, when the desorption occurs by reducing the total pressure.

Document WO2012/138910 A2 presents a methodology for the preparation of mesoporous and/or mesostructured materials by means of the modification of zeolites with low Si/Al ratio. More specifically, methodologies for the preparation of mesoporous and/or mesostructured materials by means of the structure modification followed by a mesopores introduction process are described.

Document WO2008143825 describes a process for removing $CO_2$, $N_2$ and $H_2S$ from a gaseous mixture using a PSA process. The adsorbent used has 20% or less of open pore volume in the region of meso and macropores. The invention described in document BR 112019002106-0 A2 presents a PSA process for removing water from a gaseous stream containing hydrocarbons using a 3A zeolite as adsorbent. The invention described in document AU2012223560B2 describes the removal of $H_2S$ by means of a generic cyclic adsorption/desorption process, limited to two beds. In another document, AU2012259377B2, modular equipment is described for carrying out a cyclic adsorption process, in which each module has 5 adsorption beds and an equalization tank. None of these documents specify the use of regenerative NaY zeolite, which can be applied in the PSA process.

The invention described in patent AU2012259377B2 presents equipment that removes multiple contaminants from natural gas ($H_2S$, heavy hydrocarbons, $CO_2$ and $H_2O$, mercaptans and mercury) by means of the adsorption in a bed containing multiple layers of adsorbent material (molecular sieves, silica gel, zeolites, MOFs, non-regenerative material and combinations), arranged in a specific order. In addition, the regeneration of adsorbent materials takes place by the passage of clean gas with or without an increase in operating temperature.

None of the aforementioned patent documents specify the NaY zeolite with Si/Al ratio>2.6 as a partially regenerable adsorbent material in face of the adsorption of $H_2S$ from natural gas, which is regenerated by decreasing the total operating pressure. The proposed invention, on the other hand, aims at removing $H_2S$ from natural gas using NaY zeolite with Si/Al ratio>2.6 with regeneration capacity.

The ultra-stabilized zeolite Y, containing rare earth cations and in acidic form, is a well-known material in the petroleum industry, being used in petroleum refining, in catalytic cracking units, promoting increased yields in gasoline and diesel (BHATIA, S. "Zeolite Catalysis: Principles and Applications", CRC Press, Inc., Boca Raton, Florida, 1990). Y zeolite, especially in its sodium form, does not have catalytic cracking activity, however, it has a high capacity for capturing $H_2S$.

It was evidenced in the paper by KARGE, H. G.; RASKÓ, J. (1978) "Hydrogen sulfide adsorption on faujasite-type zeolites with systematically varied Si—Al ratios". Journal of Colloid and Interface Science, v. 64, n. 3, p. 522-532, that the first $H_2S$ molecules that adsorb on NaY zeolite do so in a dissociative manner and that this dissociation becomes less and less apparent as the Si/Al ratio increases to levels above 2.6.

The paper by LUTZ, W.; SEIDEL, A.; BODDENBERG, B. (1998) "On the formation of COS from $H_2S$ and $CO_2$ in the presence of zeolite/salt compounds". Adsorption Science and Technology, v. 16, p. 577-581, evaluates the conversion of $H_2S$ and $CO_2$ to COS in NaY and NaX zeolites. It was verified that the NaY zeolite, which has a higher Si/Al ratio, has a lower conversion of $H_2S$ into COS than the NaX zeolite. According to the authors, at Si/Al ratios>2.43, $Na^+$ cations from the supercavities of the zeolite structure are not available for $H_2S$ and $CO_2$ molecules, which reduces the activity at low contact times.

Recently, in OLIVEIRA, L. H. et al. (2019) "$H_2S$ adsorption on NaY zeolite", Microporous and Mesoporous Materials, v. 284, p. 247-257, it was verified that the NaY zeolite with Si/Al ratio=2.8 presents highly favorable $H_2S$ adsorption isotherm, with high capture capacity, and with a desorption hysteresis, since a residual amount of $H_2S$ still remained adsorbed on the solid during the desorption step. This amount was 2.4034, 1.8027 and 1.0184 mol $kg^{-1}$ at temperatures of 20, 30 and 40° C., respectively. Despite this, the adsorbent still showed a high $H_2S$ capture capacity at 39.90 bar (3.99 MPa), which are equal to 6.8095, 6.5195 and 6.0302 mol $kg^{-1}$ at 20, 30 and 40° C., respectively.

The abovementioned papers show that the NaY zeolite has a high capacity to capture $H_2S$. Furthermore, it is verified that a portion of the retained $H_2S$ is removed during the desorption step, evidencing that the adsorbent is partially regenerative. This possibility of partial regeneration is explained by the fact that the adsorbent is presented as a NaY zeolite with a Si/Al ratio>2.6, which has a reduced capacity to dissociate $H_2S$ molecules, minimizing the chemisorbed quantity. It is therefore suggested that this adsorbent has great potential to be used in a PSA process.

While the high capture capacity suggests great potential for using the material in cyclic adsorption processes, the high adsorbate-adsorbent interaction, indicated by the highly favorable $H_2S$ adsorption isotherm, on the other hand, suggests low potential for this type of process, since it may make it impossible to remove the adsorbate through the drop in working pressure.

This fact, in turn, would make the solid ineffective in future adsorption cycles, eventually being replaced by a new charge of adsorbate-free solid, ultimately resulting in a costly process with low feasibility of implementation. Thus, in order to verify the potential of NaY zeolite with Si/Al ratio>2.6 in a cyclic adsorption process, it is necessary to carry out experiments under conditions closer to those of a PSA process, since it is not apparent from the present paper whether under cyclic conditions the NaY zeolite actually presents regenerative behavior and, also, whether there is degradation of the material in the face of consecutive cyclic adsorption/desorption processes.

On the other hand, the present invention proposes the use of NaY zeolite with Si/Al ratio>2.6 as a regenerable material in the adsorption of $H_2S$ present in natural gas. The regeneration of the material is possible by reducing the absolute pressure, from the operating pressure, preferably at 51 bar (5.1 MPa), to the atmospheric pressure. The use of this regenerable material would reduce the need of changing the adsorbent solid on offshore gas extraction platforms, making it possible to make the purification process more cost-effective. Thus, structural modifications to the solid are not proposed, but the use of NaY zeolite with a Si/Al ratio greater than 2.6, which has a reduced ability to dissociate $H_2S$ molecules, a fact that increases the regeneration capacity of the adsorbent solid.

The paper by GEORGIADIS, A. G.; CHARISIOU, N. D.; GOULA, M. A. (2020) "Removal of hydrogen sulfide from various industrial gases: a review of the most promising adsorbing materials", Catalysts, v. 10, doi:10.3390/catal10050521, presents a review of promising solid materials for the removal of $H_2S$ from industrial gaseous effluents. Among the various studies presented in this review paper, it is pertinent to highlight that in the paper by SIGOT, L.; DUCOM, G.; GERMAIN, P. (2016) "Adsorption of hydrogen sulfide ($H_2S$) on zeolite (Z): Retention Mechanism", Chem. Eng. J., v. 287, p. 47-53, a mechanism of interaction of $H_2S$ with 13X zeolite in the presence of water and with increasing temperature is proposed. The mechanism suggests the dissociation and dissociation of $H_2S$ in the water contained in the zeolite pores, followed by the formation of elemental sulfur and the possibility of polymerization with increasing temperature. On the other hand, the present invention proposes a new use of NaY zeolite with a Si/Al ratio greater than 2.6, in a PSA process, for the removal of $H_2S$ from a natural gas stream. The process allows partial regeneration of the zeolite in situ.

In the work of BULOW, M.; LUTZ, W.; SUCKOW, M. (1999) "The mutual transformation of hydrogen sulphide and carbonyl sulphide and its role for gas desulphurization processes with zeolitic molecular sieve sorbents", Stud. Surf. Sci. Catal., v. 120, p. 301-345, LTA and FAU type zeolites with low Si/Al ratio for $H_2S$ removal in the presence of $CO_2$ are studied, and the effect of COS formation in simulated PTSA cycles of adsorption and desorption, the latter heated, is evaluated. It was verified that the formation of COS is not suppressed by modifying the structure of the zeolite or by means of ion exchange; however, the removal of $H_2S$ is possible by using processes with shorter cycle times, such as the PSA process. The present invention also proposes a PSA process; however, the adsorbent solid used is NaY zeolite with Si/Al ratio>2.6. The experiments carried out with this zeolite disclosed a high capacity for capturing $H_2S$, stability of the amount captured in subsequent cycles and high stability of the structure in face of the adsorption of this corrosive compound. These aspects disclose the excellent use of NaY zeolite with Si/Al ratio>2.6 in the process of removing $H_2S$ from natural gas by means of the PSA process.

The paper by TOMADAKIS, M. M. et al. (2011) "Pressure swing adsorption separation of $H_2S$ from $CO_2$ with molecular sieves 4A, 5A and 13X", Sep. Sci. Technol., v. 46, p. 428-433, evaluates the ability to separate binary mixtures containing very high concentrations of $H_2S$ and $CO_2$ by means of PSA processes using 4A, 5A and 13X zeolites. It was verified that a great capacity of $CO_2$ production was obtained when using 5A and 4A zeolites, and the latter still presents high capacity when it is regenerated. However, the present invention uses NaY zeolite with a Si/Al ratio greater than 2.6 for the removal of $H_2S$ from natural gas through a PSA process.

Such publications mentioned above reflect the importance of the $H_2S$ removal process and reinforce the use of NaY zeolite as an adsorbent material. However, different from what has already been shown in the literature and, thus, with the aim of solving such problems, the present invention was developed, through the use of NaY zeolite with a high Si/Al ratio, in a cyclic adsorption process, for the selective removal of a natural gas stream. The regeneration of the material is possible due to the reduction of the absolute pressure, from the operating pressure to the atmospheric pressure. The use of this regenerable material implies the reduction in the need of changing the solid adsorbent on offshore gas extraction platforms, allowing a reduction in the cost of the purification process.

In short, the present invention presents advantages such as reducing costs associated with the displacement of tons of iron oxide to oil platforms, as there is the possibility of in situ regeneration, since the NaY zeolite allows several cycles of consecutive adsorption and desorption to be carried out before being replaced (if necessary), reducing the need for constant transfer.

In addition, the present invention avoids the exposure and handling of a pyrophoric material, currently produced during the desulfurization process with Sulfatreat®, in the discharge of the exhausted adsorption bed.

BRIEF DESCRIPTION OF THE INVENTION

The present invention addresses to a process for removing $H_2S$ from natural gas at high pressures by means of the PSA process, in which NaY zeolite with Si/Al ratio>2.6 is used as a regenerable material, in the adsorption of $H_2S$ present in natural gas. The regeneration of the material is possible by reducing the absolute pressure, from the operating pressure, preferably at 51 bar (5.1 MPa), to the atmospheric pressure. The use of this regenerable material implies the reduction in the need of changing the solid adsorbent on offshore gas extraction platforms, allowing a reduction in the cost of the purification process.

The main application involves the removal of $H_2S$ from a natural gas stream, which is at high pressure, producing natural gas at high pressures, with the specification of the $H_2S$ content through adsorption processes with pressure modulation (PSA). In this way, possible consumer markets are oil and gas exploration companies.

BRIEF DESCRIPTION OF THE DRAWINGS

The present invention will be described in more detail below, with reference to the attached figures which, in a schematic way and not limiting the inventive scope, represent examples of its embodiment, wherein.

DETAILED DESCRIPTION OF THE INVENTION

The process for removing $H_2S$ from natural gas at high pressures by means of the PSA process, as described by the invention, comprises the following steps:

a) Promoting the contact of a stream of natural gas containing $H_2S$ with particles of the NaY zeolite adsorbent with Si/Al ratio>2.6;

b) Pressurization at a pressure of 20 to 80 bar (2 to 8 MPa) and a temperature of 25 to 70° C.;

c) Adsorption under constant pressure between 20 and 80 bar (2 and 8 MPa) and at a temperature of 25 to 70° C.;

d) Depressurization from 0.9 to 1.1 bar (0.09 to 0.11 MPa), at a temperature from 25 to 70° C.;

e) Purge using $H_2S$-free gas at a temperature of 25 to 70° C.

Steps b and c are preferably conducted at a pressure of 51 bar (5.1 MPa) and a temperature of 30° C. Step d is preferably conducted at a pressure of 1 bar (0.1 MPa) and a temperature of 30° C. The natural gas stream for the PSA process has a content of up to 50,000 ppmv of $H_2S$ (5.0% mol·mol$^{-1}$ $H_2S$), highlighting that the outlet natural gas has a $H_2S$ content of less than 5 ppmv.

Figure 1:
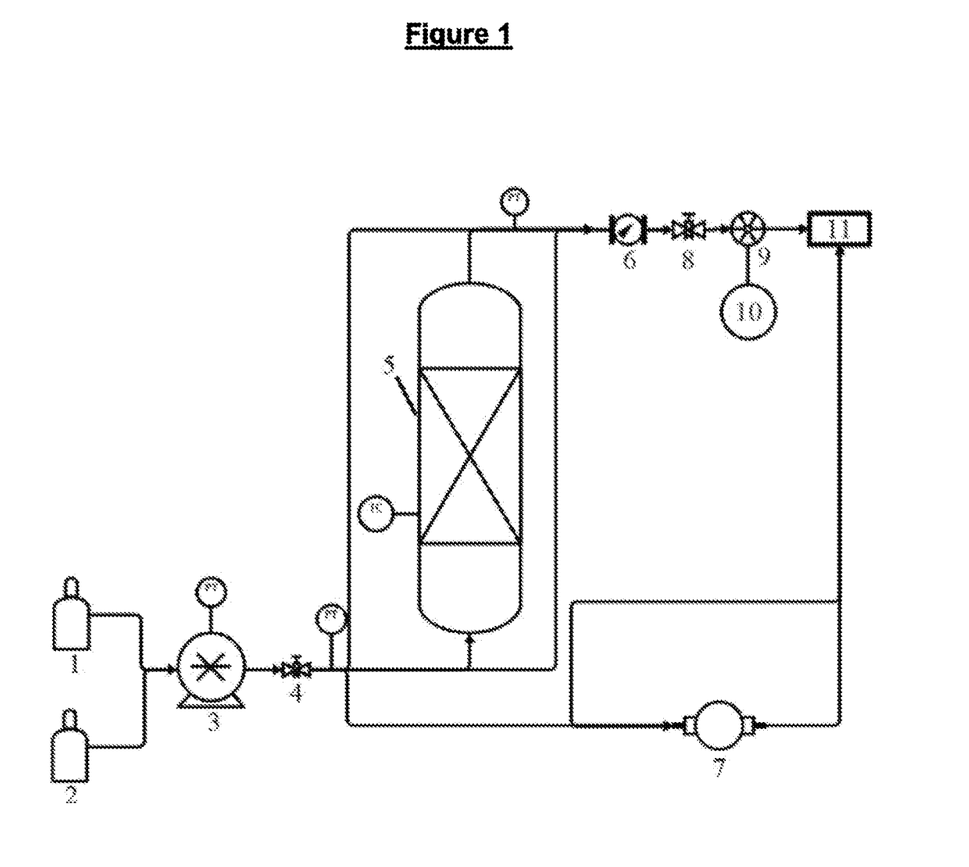
FIG. 1 shows the flowchart of the adsorption equipment at high pressures, which was used to evaluate the potential application of NaY zeolite with a Si/Al ratio greater than 2.6 in the adsorption of $H_2S$, where there are represented: pressurization gas (1) and adsorbate (2); syringe pump (3); micrometric valve at the inlet (4) and outlet (8) of the adsorption bed; adsorption bed (5); mass flow rate meter (6); vacuum pump (7); 6-way electric valve (9); gas chromatograph (10); and extractor (11)

Consecutive adsorption and desorption tests were carried out in a high-pressure adsorption module shown in FIG. 1. This module allows pressurization gases (1) or adsorbate (2) to be fed into a syringe pump (3), which controls the gas pressure at the inlet of the bed (5). The module also has a micrometric valve (4), which allows pressurization control at the bed inlet (5), when necessary; an adsorption bed (5), which allows accommodation of the adsorbent solid; a mass flow rate meter (6); a vacuum pump (7); a micrometric valve at the bed outlet (8) allowing the control of the volumetric flow rate at the outlet; an electric 6-way valve (9) allowing the periodic injection of portions of the effluent gas from the adsorption bed; a gas chromatograph (10), equipped with a thermal conductivity detector (TCD). The effluent gases are led to the exhaustion (11).

The invention presents a new application of NaY zeolite with Si/Al ratio>2.6, that is, the removal of hydrogen sulfide from a stream of natural gas at pressures from 20 to 80 bar (2 to 8 MPa), for the production of gas practically free of $H_2S$ at high pressures. The material shows partial regenerability in this process, when the total operating pressure is reduced to the atmospheric pressure. In this way, there is the possibility of using the material in a fixed bed for an extended period of time. Thus, its main advantage is the possibility of regenerating the NaY zeolite in the process equipment, that is, in situ, eliminating or reducing the changing of solid material, a process that is very costly in offshore operations.

EXAMPLES

The following examples are presented in order to illustrate some particular embodiments of the present invention, and should not be interpreted as limiting the same.

To prove the use of NaY zeolite with Si/Al ratio>2.6 as a regenerable material in face of the adsorption of $H_2S$ in a PSA process, the following steps of preparation of NaY zeolite particles without a binder, in adsorption/desorption cycles of $H_2S$, were carried out as described below.

Example 1: Preparation of NaY Zeolite Particles without Binder

The NaY zeolite used, with Si/Al ratio=2.8, in powder form, was pelletized in a press at 8 ton for 5 minutes. The formed pellet was crushed and classified in sieves. The content retained between 65 and 100 mesh sieves was collected, making the mean particle diameter equal to 0.1810 mm. The solid was inserted into the adsorption bed (5) of FIG. 1.

Example 2: Adsorption of He+$H_2S$

Consecutive adsorption and desorption tests were carried out in an adsorption module at high pressures, which is illustrated in FIG. 1. This module allows pressurization gases (1) or adsorbate (2) to be fed into a syringe pump (3), which controls the gas pressure at the inlet of the bed (5). The module also has a micrometric valve (4), which allows pressurization control at the inlet of the bed (5), when necessary; an adsorption bed (5), which allows accommodation of the adsorbent solid; a mass flow rate meter (6); a vacuum pump (7); a micrometric valve at the bed outlet (8), allowing the control of the volumetric flow at the outlet; an electric 6-way valve (9), allowing the periodic injection of portions of the effluent gas from the adsorption bed; a gas chromatograph (10), equipped with a thermal conductivity detector (TCD). The effluent gases are led to the exhaustion (11). The tests followed the steps described below:

a) Prior to adsorption, a heat treatment aimed at removing water was employed. Initially, helium was drained at ambient pressure with a flow rate of 50 mL min$^{-1}$, at a temperature of 300° C., achieved through a heating ramp of 10° C. min$^{-1}$. Then, a vacuum was created in the system by the vacuum pump (7). This step lasted 6 hours and was performed just before the first adsorption cycle;

b) After the activation procedure, the consecutive adsorption/desorption cycles were carried out following the sequence of events: Pressurization, Adsorption, Depressurization and Purging.

I. In the pressurization step, the bed was pressurized to an absolute pressure of 51 bar (5.1 MPa) and a temperature of 30° C.

II. In the adsorption step, a mixture of 4.96% mol·mol$^{-1}$ of $H_2S$ in 95.04% of He was passed through the bed (5), at a flow rate of 100 NmL·min$^{-1}$;

III. In the desorption step, the bed was depressurized from an absolute pressure of 51 bar (5.1 MPa) to an absolute pressure of 1 bar (0.1 MPa);

IV. In the purge step, He was fed at 100 NmL·min$^{-1}$, at a total pressure of 1 bar (0.1 MPa), for 30 min;

c) At the end of the purge step, a new pressurization was performed and the cycle was repeated. In total, the procedure was repeated 15 times;

d) The composition of the gas at the bed outlet was calculated by means of the integration of the peaks detected by the TCD and subsequent application of the external standard method for quantification.

Figure 2:
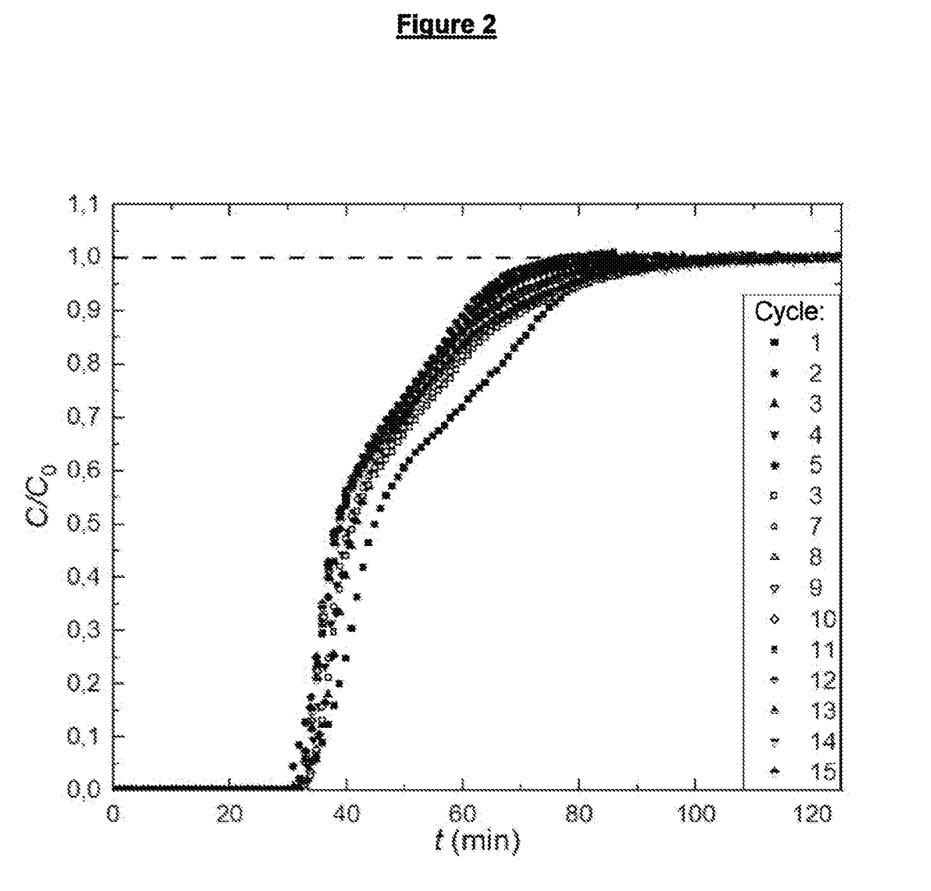
FIG. 2 illustrates the breakdown curves of $H_2S$ in NaY zeolite obtained in the adsorption/desorption cycles.

As shown in FIG. 2, it appears that the breakdown curves of cycles 2 to 15 are displaced from the curve of cycle 1, for shorter retention times, indicating a decrease in the capacity to capture $H_2S$.

Figure 3:
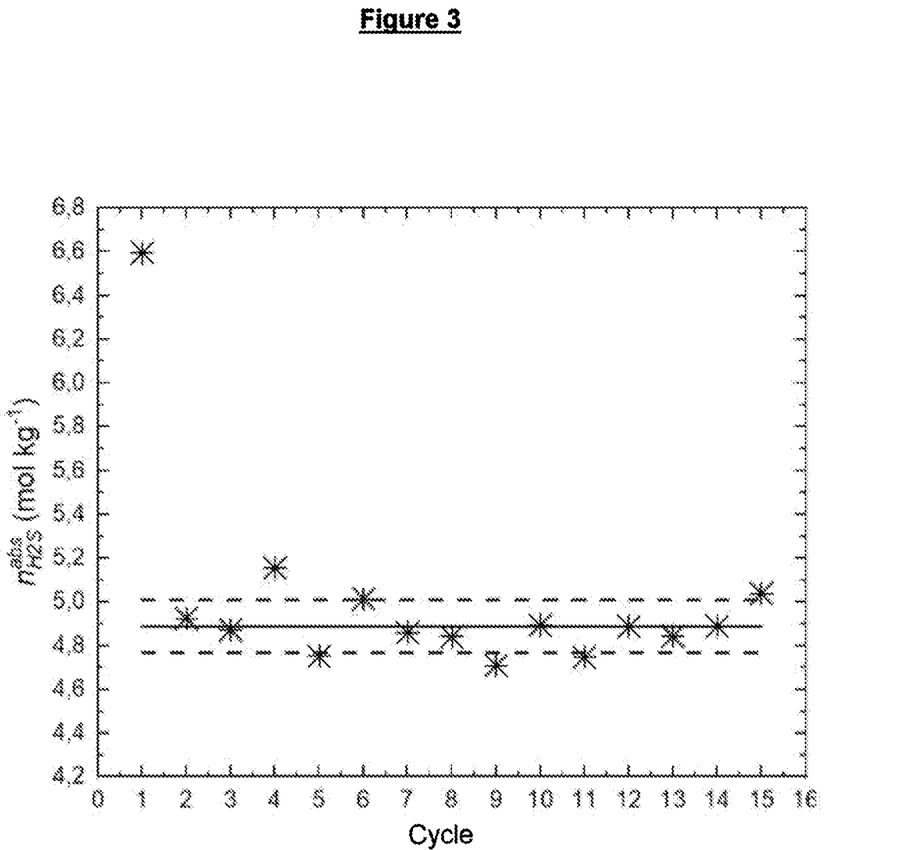
FIG. 3 shows a graph containing the amounts of $H_2S$ adsorbed in each adsorption cycle.

The calculation of the absolute amount adsorbed in each cycle, performed by means of the material balance applied in each adsorption step, discloses that in the first adsorption run the material has the capacity to remove 6.59 mol of $H_2S$ per kg of NaY zeolite. In later cycles, this amount reduced, on average, by 25.8%, to 4.89 mol of $H_2S$ per kg of NaY zeolite. Despite the reduction, this value remained stable in subsequent cycles, as indicated by FIG. 3.

Figure 4:
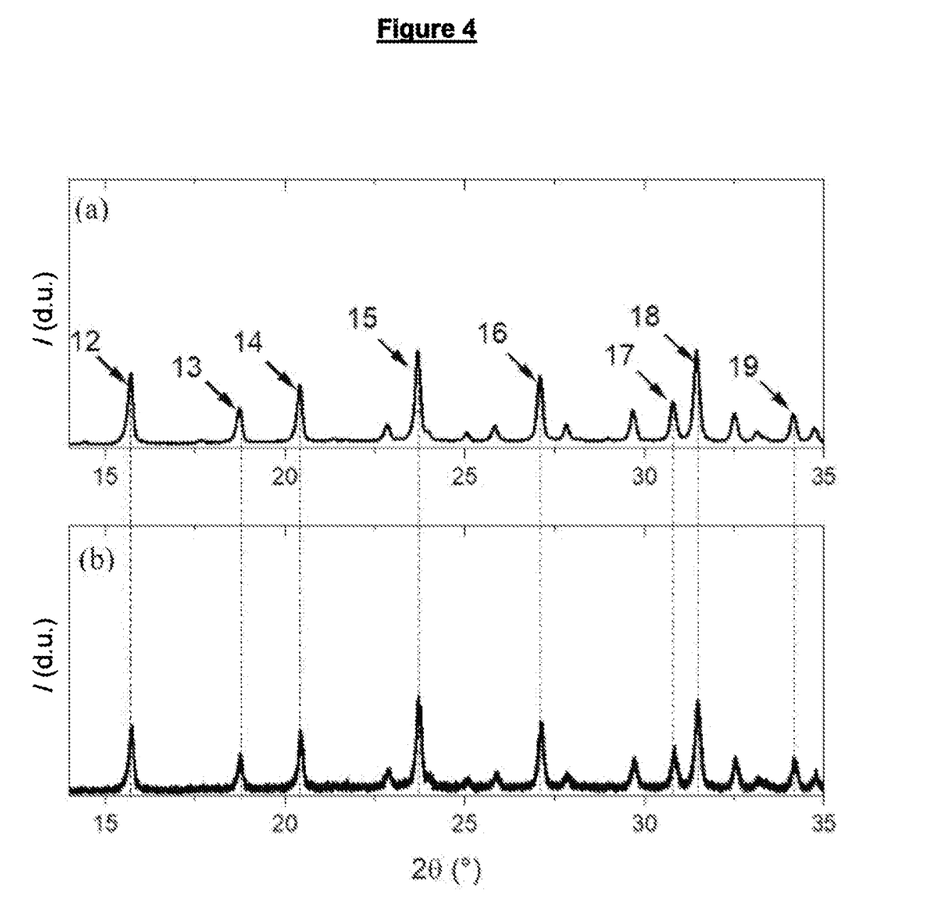
FIG. 4 illustrates (a) the X-ray diffractogram of the NaY zeolite, measured before the adsorption and desorption cycles, and (b) the X-ray diffractogram measured after the adsorption/desorption cycles.

The X-ray diffractometry performed on the material before (FIG. 4 (a)) and after (FIG. 4 (b)) cycles of adsorption/desorption of $H_2S$ showed no significant difference. The characteristic peaks of NaY zeolite (12 to 19) do not show horizontal displacement and practically have the same shape and intensity. In fact, the application of the method described by ASTM D396-19—"Standard Test Method for Determination of Relative X-ray Diffraction Intensities of Faujasite-Type Zeolite-Containing Materials", indicates low crystallinity reduction. The zeolite subjected to adsorption and desorption cycles showed 96.2% of the crystallinity of the starting zeolite. Such a fact discloses that the structure of the material was not severely affected by continuous contact with $H_2S$, which proves the stability of the adsorbent solid in face of the consecutive adsorption of $H_2S$.

Example 3: Adsorption of $CH_4+CO_2+H_2S$

Another adsorption test was conducted, with the objective of verifying whether the adsorbent material was selective to $H_2S$ even in the presence of $CH_4$ and $CO_2$ gases, the main components of natural gas. This test was carried out in two stages. In Step 1, 5 cycles of adsorption and desorption of $H_2S+He$ gas were performed, allowing the chemisorption of $H_2S$. In Step 2, 2 cycles of adsorption and desorption of gas containing $CH_4+CO_2+H_2S+He$ were carried out, allowing to evaluate the selectivity of adsorption of $H_2S$ in relation to $CH_4$ and $CO_2$.

Step 1 was conducted in accordance with the procedures described below:

a) A thermal treatment was used to remove the water contained in the adsorbent material. Initially, helium was drained at ambient pressure with a flow rate of 50 mL·min$^{-1}$, at a temperature of 300° C., achieved through a heating ramp of 10° C.·min$^{-1}$. Then, a vacuum was created in the system by the vacuum pump (7). This procedure lasted 6 hours and was performed just before the first adsorption cycle;

b) After the activation procedure, the consecutive adsorption/desorption cycles were carried out following the sequence of events: Pressurization, Adsorption, Depressurization and Purging.

I. In the pressurization process, the bed was pressurized to an absolute pressure of 51 bar (5.1 MPa) and a temperature of 30° C.;

II. In the adsorption process, a mixture of 4.96% mol mol$^{-1}$ $H_2S$ in 95.04% He was passed through the bed (5) at a flow rate of 300 NmL·min$^{-1}$;

III. In the desorption process, the bed was depressurized from an absolute pressure of 51 bar (5.1 MPa) to an absolute pressure of 1 bar (0.1 MPa);

IV. In the purging process, He was fed at 300 NmL·min$^{-1}$, at a total pressure of 1 bar (0.1 MPa), for 30 min.

c) At the end of the purging process, a new pressurization was performed and the cycle was repeated. This procedure was repeated 5 times.

In Step 2, the $CH_4+CO_2+H_2S+He$ adsorption/desorption tests were conducted following the sequence of events: Pressurization, Adsorption, Depressurization and Purging.

a) In the pressurization process, the bed was pressurized to an absolute pressure of 51 bar (5.1 MPa) and a temperature of 30° C.;

b) In the adsorption process, a mixture was passed through the bed (5) which contained 27.6% mol·mol$^{-1}$ of $CH_4$, 16.9% mol·mol$^{-1}$ of $CO_2$, 1.98% mol·mol$^{-1}$ of $H_2S$ and 53.5% mol mol$^{-1}$ of He at a flow rate of 400 NmL·min$^{-1}$;

c) In the desorption process, the bed was depressurized from an absolute pressure of 51 bar (5.1 MPa) to the absolute pressure of 1 bar (0.1 MPa);

d) In the purge process, He was fed at 400 NmL·min$^{-1}$ at a total pressure of 1 bar (0.1 MPa) for 30 min.

At the end of the purge step, a new pressurization was performed and the cycle was repeated.

The gas composition at the bed outlet was calculated by integrating the peaks detected by the TCD and subsequent application of the external standard method for quantification.

Figure 5:
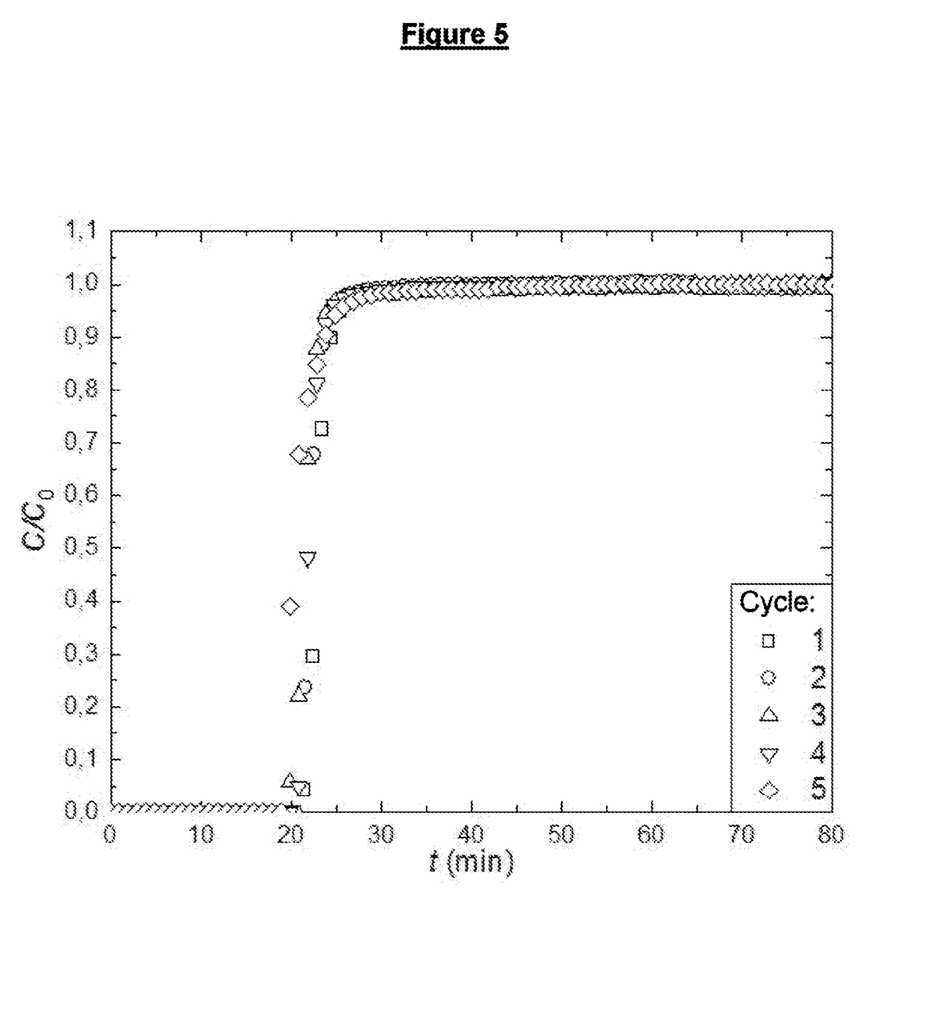
FIG. 5 illustrates adsorption tests carried out in the first stage showing the breakdown curves of cycles 1 to 5.

Regarding the adsorption tests performed in the first stage, as shown in FIG. 5, the breakdown curves of cycles 1 to 5 practically coincide, suggesting that there is little change in the amount adsorbed from one cycle to the next.

Figure 6:
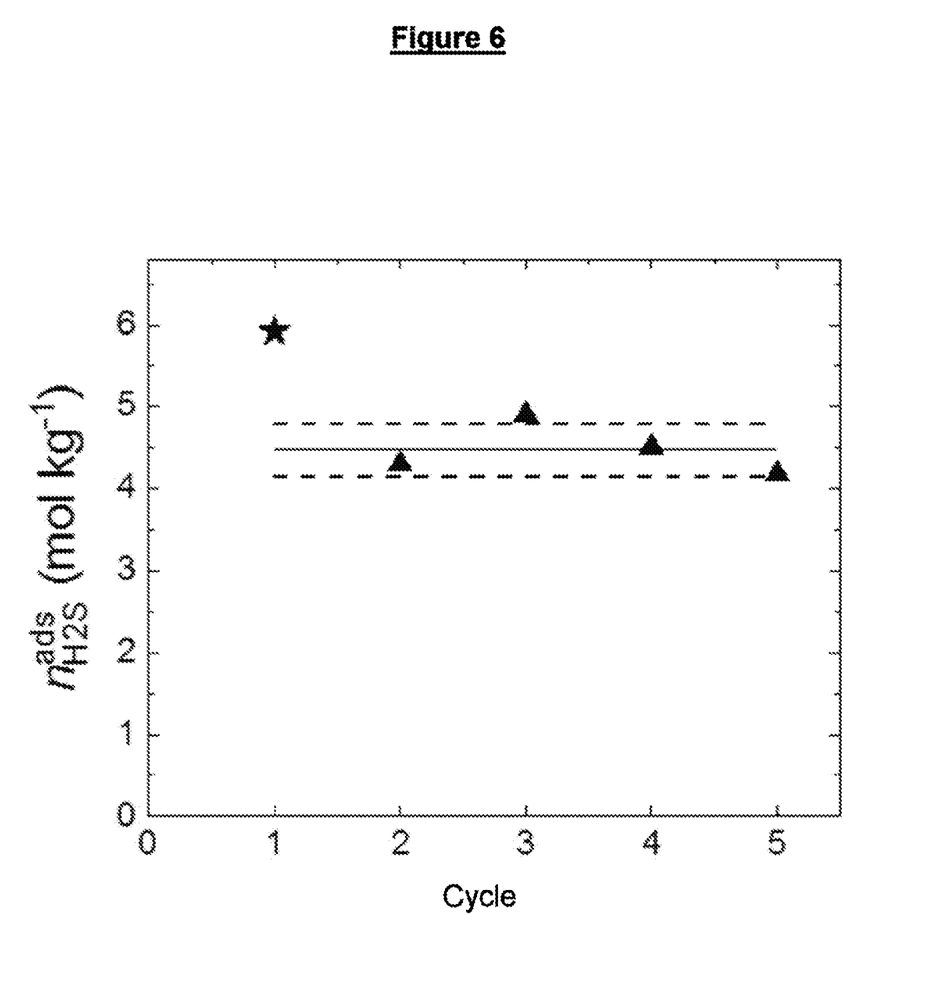
FIG. 6 shows the absorbed amount of $H_2S$/kg zeolite per cycle.

The calculation of the absolute amount adsorbed in each cycle, performed by means of the material balance applied in each adsorption step, discloses that in the first adsorption run, the material has the capacity to remove 5.92 mol of $H_2S$ per kg of NaY zeolite. In later cycles, this amount reduced, on average, by 25.5%, to 4.47 mol of $H_2S$ per kg of NaY zeolite. Despite the reduction, this value remained stable in subsequent cycles, as shown in FIG. 6.

Figure 7:
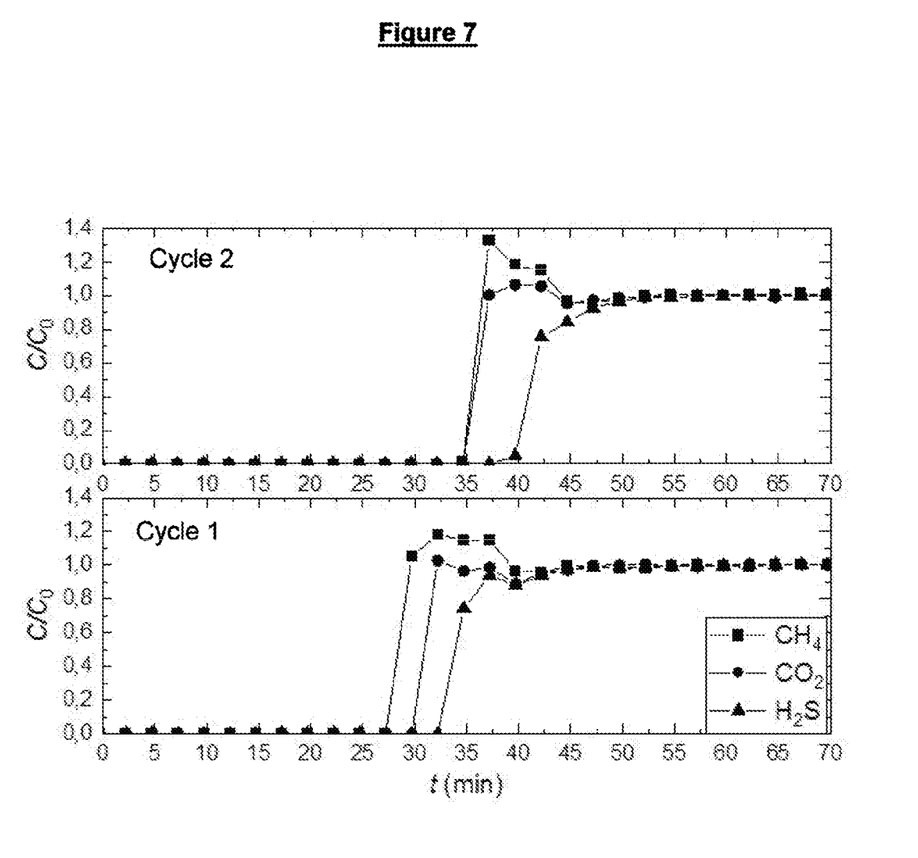
FIG. 7 shows the adsorption of the $CH_4+CO_2+H_2S+He$ mixture.

With regard to the adsorption of the mixture $CH_4+CO_2+H_2S+He$, it is shown in FIG. 7 that the breakdown curves of $CH_4$ and $CO_2$ are prior to the breakdown curve of $H_2S$, disclosing that $CH_4$ and $CO_2$ are effluent from the adsorption bed before $H_2S$. It is observed that a free stream of $H_2S$ is produced for a time of 32.2 minutes in the first cycle and 37.7 minutes in the second cycle.

The breakdown curves of $CH_4$ and $CO_2$ show the roll-up effect, that is, their concentrations at the outlet exceed the respective initial concentrations (Li, G., Xiao, P., Xu, D., & Webley, P. A. (2011). Dual mode roll-up effect in multicomponent non-isothermal adsorption processes with multilayered bed packing. In Chemical Engineering Science (Vol. 66, Issue 9, pp. 1825-1834). Elsevier BV. https://doi.org/10.1016/j.ces.2011.01.023). This phenomenon is generally related to the displacement of one component by the other due to different affinities with the solid surface. In this context, it is suggested that both $CH_4$ and $CO_2$ are displaced by $H_2S$.

The high amount of capture verified, the stability of the amount captured in subsequent cycles, even with prolonged contact with $H_2S$ in very high concentration, combined with the high stability of the structure in the adsorption of this corrosive compound, make the NaY zeolite a promising adsorbent for removal of $H_2S$ contained in natural gas, at high pressures, through a PSA process.

It should be noted that, although the present invention has been described in relation to the attached drawings, it may undergo modifications and adaptations by technicians skilled on the subject, depending on the specific situation, but provided that within the inventive scope defined herein.

The invention claimed is:

1. A process to remove $H_2S$ from natural gas with pressure swing adsorption, the process comprising:
    promoting contact of a stream of natural gas containing $H_2S$ with particles of NaY zeolite adsorbent;
    pressurizing to a pressure of 51 to 80 bar 5.1 to 8 MPa) and a temperature of 25 to 70° C.;
    adsorbing under a constant pressure between 51 and 80 bar (5.1 and 8 MPa) and at a temperature of 25 to 70° C.;
    depressurizing to a pressure from about 0.9 to about 1.1 bar (0.09 to 0.11 MPa), at a temperature from about 25° C. to about 70° C.; and
    purging using $H_2S$-free gas at a temperature of 25 to 70° C.

2. The process according to claim 1, wherein the NaY zeolite has a Si/Al ratio equal to or greater than 2.6.

3. The process according to claim 1, wherein pressurizing and adsorbing are conducted at a temperature of 30° C.

4. The process according to claim 1, wherein depressurizing is conducted to a pressure of about 1 bar (0.1 MPa) and a temperature of about 30° C.

5. The process according to claim 1, wherein the NaY zeolite has an average particle diameter equal to 0.1810 mm.

6. A process to remove $H_2S$ from natural gas with pressure swing adsorption, the process comprising:
    promoting contact of a stream of natural gas containing $H_2S$ with particles of NaY zeolite adsorbent, wherein the NaY zeolite has an average particle diameter equal to 0.1810 mm;
    pressurizing to a pressure of 20 to 80 bar (2 to 8 MPa) and a temperature of 25 to 70° C.;
    adsorbing under a constant pressure between 20 and 80 bar (2 and 8 MPa) and at a temperature of 25 to 70° C.;
    depressurizing to a pressure from about 0.9 to about 1.1 bar (0.09 to 0.11 MPa), at a temperature from about 25° C. to about 70° C.; and
    purging using $H_2S$-free gas at a temperature of 25 to 70° C.

7. The process according to claim 6, wherein the NaY zeolite has a Si/Al ratio equal to or greater than 2.6.

8. The process according to claim 6, wherein pressurizing and adsorbing are conducted at a temperature of 30° C.

* * * * *